United States Patent Office 2,927,862
Patented Mar. 8, 1960

2,927,862

METHOD OF TINTING SURFACE COVERINGS

Charles W. Welch, Kansas City, Mo., assignor to Welco Manufacturing Company, Incorporated, Kansas City, Mo., a corporation of Missouri No Drawing. Application June 20, 1955
Serial No. 516,805

2 Claims. (Cl. 106—97)

This invention relates to surface coverings, and more particularly to a method of tinting powdered cold water paints.

Although a practical method for the tinting of oil and latex water base paints on the consumer level has been known and practiced for a number of years, the method has not been extended to the powdered cold water paint field. By this method, the paint is tinted to the desired shade after packaging, a predetermined quantity of dry coloring pigment being added and mixed with the paint. Therefore, it is the primary object of this invention to provide a method for uniformly dispersing a dry coloring pigment throughout a powdered cold water paint.

A further object is the provision of a method of producing a tinting agent that when added to water and mixed with a powdered cold water paint will produce a uniform dispersion of the pigment in the paint. An important object is the provision of a method of uniformly dispersing a dry coloring pigment in water to form a slurry, the dispersion being effected by a surface tension depressant.

Another object is the provision of a method of tinting powdered cold water paints which makes possible the manufacturing of only white paint and thus effecting great economies in cost of production and in marketing. Also an object is to provide an economically feasible method of perfectly matching the color of subsequent batches of tinted powdered cold water paints.

The heretofore practiced method of tinting paints after they have been packaged is to add the pigment to the container of paint and agitate until a uniform dispersion is obtained. However, this is not possible in the cold water paint field because these paints are shipped in a dry form, water being added immediately before application. Also, the properties of cold water paint presents problems that are not found in the other types of paint.

Cold water paints come in several different forms, the powdered base components of the two most common being hydraulic cement base paint and a paint composed mainly of powdered mica, asbestos and a binder. Cement base paint may generally be obtained in two forms, one containing approximately 65 percent by weight Portland cement and not more than 25 percent calcium hydroxide. The other form contains approximately 80 percent Portland cement, and the remainder is calcium hydroxide and siliceous aggregate. Small quantities of titanium dioxide are also included in both forms. The other type of cold water paint is composed chiefly of powdered mica, asbestos, calcium carbonate and a binder composed of either casein, glue, soya flour, or cellulose. This type is generally used as an interior texture paint. Since these paints are strongly basic when mixed with water, the tinting pigment must be substantially neutral and lime proof.

To obtain a painted surface in which the color is uniform, the tinting pigment must be uniformly distributed throughout the paint, and, in the usual tinting process this dispersion is produced by a surface tension depressant. To get the desired results when the tint is added to the paint, it is necessary to put the surface active agent on the surface of the particles of pigment, and the method of doing this is a time consuming and expensive process.

In the present method of tinting powdered cold water paints the finely divided pigment is thoroughly admixed with a finely divided granular material having a solid surface tension depressant coated thereon or a finely divided solid surface tension depressant, and then the admixture is added to water with stirring to form a slurry. The surface active agent causes the pigment to disperse throughout the water and a uniform suspension is obtained. The tinting slurry is then added to the paint with stirring and a uniformly tinted paint results. The term "solid" surface tension depressant as used herein denotes those surface active agents having a melting point above normal room temperature or 20° C.

Elimination of the step of thoroughly and completely coating the particles of pigment with the surface active agent is a very important one economically. If a liquid surface tension depressant is to be used as the dispersing agent it can easily be sprayed onto a granular material such as clay, this clay then being admixed with the pigment and the admixture stirred into the water, the surface active agent causing the pigment to disperse therein. When a solid surface tension depressant is used it is merely admixed thoroughly with the pigment. The same results would not be obtained by first admixing the tinting agent containing the surface tension depressant and the paint, and then adding the water.

The method of mixing the finely divided pigment with the surface tension depressant is important and is applicable to both a solid surface active agent or one that has been sprayed onto finely divided clay. The preferred method utilizes a ribbon mixer, calcium carbonate first being screened into the mixer, the pigment next being carefully screened in, and then finally the solid surface active agent or the coated, finely divided clay. After all the ingredients have been added to the mixer, the tinting agent is mixed for approximately four hours before a color comparison is made as it has been found that approximately this time is necessary for the tint to reach its maximum color standard, more coloring pigment or whitening agent may be added and the tint again mixed. Color comparison tests may be made at any desired interval and it is not necessary that the tint reach its maximum intensity, only that the tint exactly match the standard. Among the factors that influence the time necessary to effect the required color match are temperature, humidity, the type of pigment being mixed, the amount of coated clay, and the speed of the mixing machine. The process time may vary from 3 hours to 30 hours. Any suitable mixing machine may be used in the above process but it has been found that a ribbon mixer is the preferred type.

The following are examples of the preferred proportions of calcium carbonate and surface active agent to the listed pigments:

*Example 1*

| | Parts |
|---|---|
| Ultramarine blue | 1.0 |
| Calcium carbonate | 1.0 |
| Dioctyl sodium sulfosuccinate | 0.07 |

*Example 2*

| | |
|---|---|
| Chromic oxide | 1.0 |
| Calcium carbonate | 5.0 |
| Sodium glyceryl monolaurate sulfate | 0.1 |

*Example 3*

| | |
|---|---|
| Iron oxide | 1.0 |
| Calcium carbonate | 8.0 |
| Pentaerythritol monolaurate | 0.1 |

Example 4

| | |
|---|---|
| Cadmium yellow oxide | 0.68 |
| Yellow iron oxide | 0.44 |
| Calcium carbonate | 6.0 |
| Sodium B-oleylethanesulfonate | 0.1 |

The proportion of surface active agent to calcium carbonate and pigment is not critical, but the above examples are offered as suitable proportions with the particular pigments disclosed. Any of the more than 200 surface active agents now available also could be utilized in the present invention, a list of them being available in Interscience (New York, 1949), "Surface Active Agents", by A. M. Swartz and J. W. Perry. The amount of surface active agent necessary to effect the desired dispersion of the pigment in the water is governed chiefly by the following factors: density of the pigment; the particle size; the comparative incompatibility of the particles of pigment; and the electrostatic charge on the particles.

In the oil and water base resin paint field, the tinting agent is added to the mill and mixed until the proper color is obtained, but in the powdered cold water paint field, to mix the dry powder with the pigment until a uniform dispersion is obtained is a time consuming and costly procedure. Therefore, although the mixing of the pigment with the dispersing agent still consumes approximately the same time as would be involved in dispersing the pigment in the paint, large enough batches of the pigment are mixed at one time to make the process economically feasible. Also an important factor is that when the method of the present invention is carried out a more uniform dispersion of the pigment in the paint is obtained than if the pigment were mechanically mixed into the powdered paint prior to packaging.

According to the process of the present invention, when the slurry containing the pigment is mixed with the powdered cold water paint, a uniform color is produced that exactly matches all precedent batches of paint and that will match all subsequent batches of paint. It should be understood, however, that in order to obtain the desired color and in order to match any precedent or subsequent color, the same amount of tinting agent must be added to exactly the same amount of powdered cold water paint each time. Also the water must be measured accurately each time, if an excessive amount is added to one can of paint this extra addition must also be carried throughout subsequent mixings.

Having thus described the invention what is claimed as new and desired to be secured by Letters Patent is:

1. A method of reproducibly and uniformly tinting a relatively small amount of the components of an initially dry, powdered, cold water paint comprising the steps of grinding an amount of a dry water-insoluble, finely divided coloring pigment with calcium carbonate and a quantity of dry solid surface tension depressant capable of completely dispersing said amount of pigment in a predetermined proportion of water; introducing the dry admixture into said proportion of water to present a tinting slurry; and thoroughly admixing the tinting slurry with a predetermined amount of said powdered cold water paint.

2. A method as set forth in claim 1 wherein said surface tension depressant is initially in liquid form and is applied to and allowed to dry on the granules of a particulate clay prior to admixing of the same with said coloring pigment.

References Cited in the file of this patent

UNITED STATES PATENTS

| | | |
|---|---|---|
| 1,453,457 | Haldeman | May 1, 1923 |
| 1,972,208 | Tucker | Sept. 4, 1934 |
| 2,132,243 | Minaker | Oct. 4, 1938 |
| 2,167,221 | Scholz | July 25, 1939 |
| 2,212,566 | Kinney | Aug. 27, 1940 |
| 2,497,346 | Collins | Feb. 14, 1950 |
| 2,513,121 | Tutt et al. | June 27, 1950 |

FOREIGN PATENTS

| | | |
|---|---|---|
| 118,040 | Great Britain | Jan. 30, 1942 |

OTHER REFERENCES

A. M. Schwartz and J. W. Perry: Surface Active Agents, 1949, page 475.